No. 882,485. PATENTED MAR. 17, 1908.
W. H. BERTRAM.
CHECK FORM.
APPLICATION FILED JULY 25, 1907.

Witnesses:

Inventor:
William H Bertram

UNITED STATES PATENT OFFICE.

WILLIAM H. BERTRAM, OF SPRINGFIELD, MISSOURI.

CHECK-FORM.

No. 882,485.  Specification of Letters Patent.  Patented March 17, 1908.

Application filed July 25, 1907. Serial No. 385,588.

*To all whom it may concern:*

Be it known that I, WILLIAM H. BERTRAM, a citizen of the United States, a resident of Springfield, in the county of Greene, State of Missouri, have invented new and useful Improvements in Check-Forms, of which the following is a specification.

The object of my invention is to provide an improved check form for protection in the use of bank and commercial paper such as drafts, checks, notes, etc.

The invention is embodied in a check form as hereinafter described, and shown in the accompanying drawings, which represents a plan view of a blank instrument filled out and directing the payment of a certain sum.

A indicates the body of the instrument; A' that portion of said body which includes the direction to pay a certain amount to a certain person etc. In this instance said body A' bears the number "1486," and is dated "Springfield, Missouri, February 14, 1907," and directed to the "Springfield Trust Company," which is ordered to "Pay to John Doe or bearer $9,876.$\frac{54}{100}$, Nine thousand eight hundred and seventy-six dollars and fifty-four cents," and signed "Richard Roe." On the same body A of the instrument is a block or square $A^2$, which is divided by ten vertical parallel lines spaced equidistantly into eleven vertical spaces. The two lower horizontal rows or spaces are for the entry of cents, and accordingly the sign C is placed opposite each row. The lower row is for units, and the second or the upper row for thousands. The horizontal rows or spaces above these are for the entry of dollars, and accordingly the usual $-sign is placed at the left, opposite each row. The first lower row indicated by the dollar sign is for units, the next for tens, the third for hundreds, and the fourth for thousands. Between the several horizontal rows of blank spaces there is a series of horizontal rows of numerals which are used purely for identification, and never for indicating value.

On the left of the body of the instrument is a stub $A^3$, upon which there is a block or square $A^4$ that is identical with the described block or square $A^2$, save that the horizontal spaces that are blank in $A^2$ are in this case filled with numerals from one to zero inclusive, the same being preferably arranged in a different order. Thus in the lower cent row, one reads the numerals from right to left beginning with one, and in the second row the numeral one occurs one space to the left, and so on successively to the top. The rows of numerals expressing value will obviously serve to identify the body of the check or instrument. This stub or key $A^3$ is to be kept by the maker of the check, draft, or note, while the body A together with the block or square $A^2$ printed thereon, when presented, may be identified by the corresponding rows of identifying numerals. In this instance the order is for payment of $9,876.54. The maker of the instrument fills out the square $A^2$ correspondingly; that is to say, in the blank space indicated in the stub by the numeral 4 in the lower, or unit, row for cents, he places the numeral 4, and in the second row for cents he places the numeral 5 in the space indicated by 5 on the stub; again he places the numeral 6 in the unit row for dollars, the numeral 7 in the tens row for dollars, the numeral 8 in the hundreds row for dollars, and the numeral 9 in the top or thousands row for dollars. On the stub the several numerals 9, 8, 7, 6, 5, 4 indicating the sum to be paid may be indicated by crossing the corresponding numerals as indicated in the block or square $A^4$. In order that there may be no mistake in the entry of dollars and cents in this manner on the respective blocks or squares, it is obvious that no numeral is repeated in any of the rows of the numerals indicating value. In other words, in each row the numerals run from one to zero, however they may be otherwise arranged.

On the stub appears in addition to the block or square $A^4$ the following: "Book A #1486, Serial 1," and the same appears also on the body A of the instrument.

On the right hand end of the instrument is the block or square $A^5$ which corresponds with the stub $A^3$ in all particulars and is a duplicate key or stub to be kept by the bank or person using the check form. This draft or stub is separable from the body by means of perforations $a$. The stub $A^3$ is similarly separable from the body of the instrument by perforated lines $a'$.

It is apparent that upon presentation of the body of the instrument to the bank or other party directed to pay the sum indicated, the bank or other payer may ascertain whether the instrument has been raised or changed in any particular, by comparing the square $A^2$ with the form $A^5$ which may be sent by mail.

The horizontal lines or identifying figures or numerals on the several blocks or squares may be different in every two instruments, but must, of course, correspond with each other on any particular instrument.

What I claim is:

The improved blank check form, comprising two duplicate stubs, each having a block or square formed by ten parallel vertical lines, horizontal rows of numerals from one to zero arranged in the spaces thus provided and suitably designated for expressing value in cents and dollars from unity upward, and a series of rows of identifying numerals arranged horizontally between the rows of numerals designated for indicating value, and a body portion A having a suitable space designated for direction of payment of a certain sum, and also a block or square having horizontal rows of identifying numerals similar to those on the two duplicate stubs, the spaces between each two rows of identifying numerals being blank for entry of figures or numerals for expressing the amount specified in the body of the instrument, as described.

WILLIAM H. BERTRAM.

We, the undersigned J. T. WHITE and LOLA VAN BUREN hereby certify that the above-named WILLIAM H. BERTRAM signed his name above, in our presence, and that we, in his presence and in the presence of each other, have hereunto signed our names as witnesses to the signature of the said WILLIAM H. BERTRAM, this 14th day of February, 1907.

J. T. WHITE.
LOLA VAN BUREN.